Jan. 22, 1963  H. J. WILLIAMS  3,074,472
FUEL FEEDING SYSTEM FOR GAS TURBINE ENGINES
Original Filed Aug. 3, 1948  4 Sheets-Sheet 1
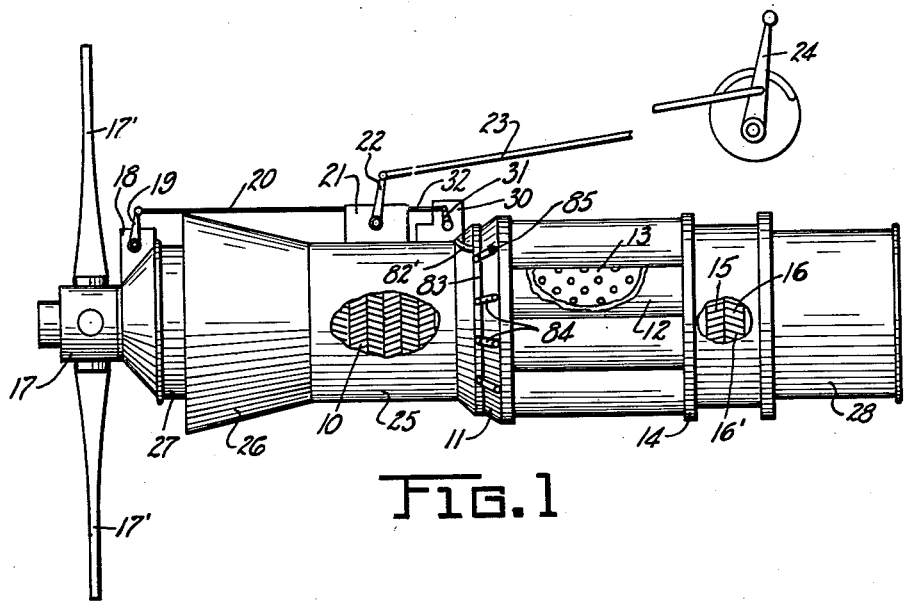
Fig.1
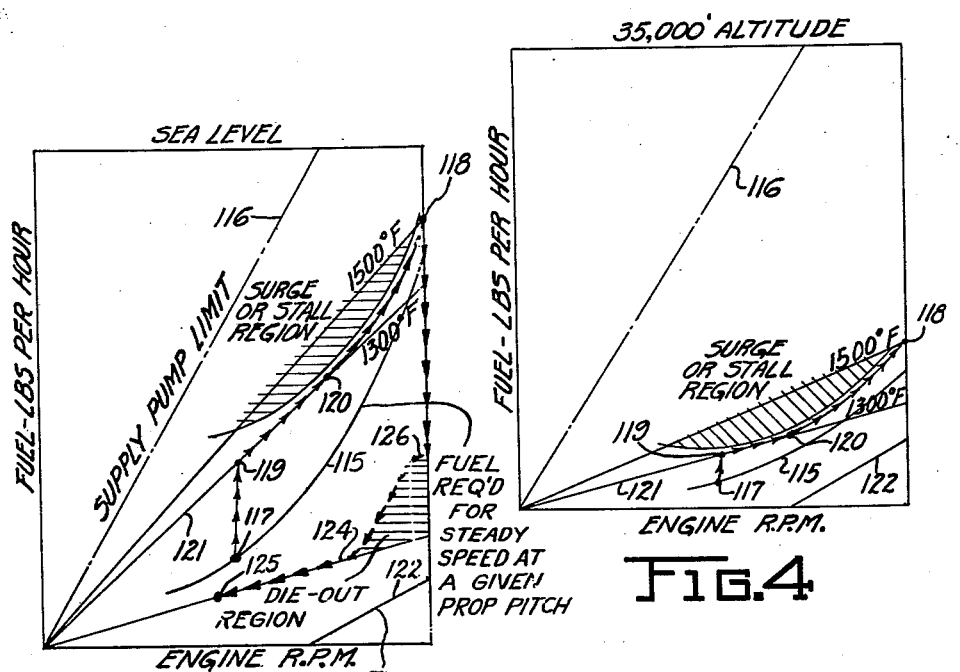
Fig.3
Fig.4
INVENTOR
HOWARD J. WILLIAMS
BY
ATTORNEY Jan. 22, 1963  H. J. WILLIAMS  3,074,472
FUEL FEEDING SYSTEM FOR GAS TURBINE ENGINES
Original Filed Aug. 3, 1948  4 Sheets-Sheet 2

INVENTOR
HOWARD J. WILLIAMS
BY
K. L. Doub
ATTORNEY

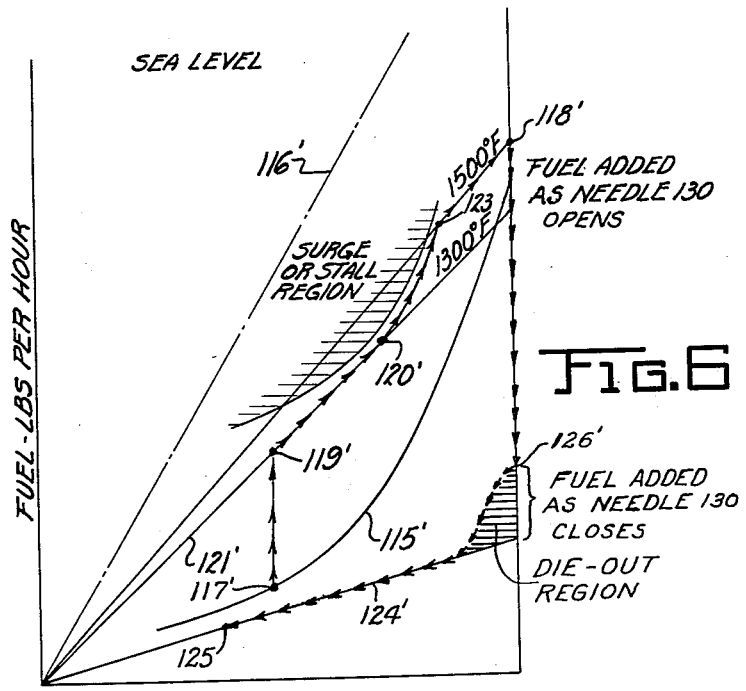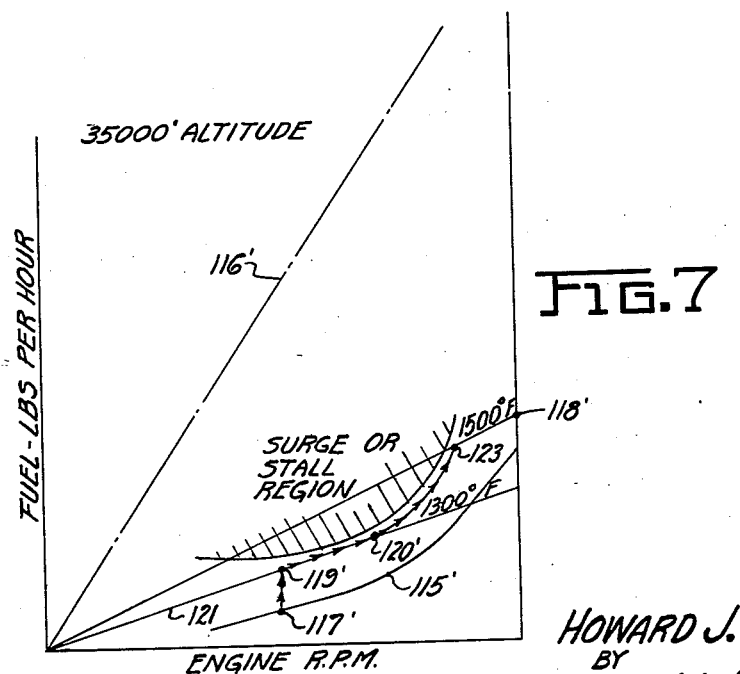

United States Patent Office 3,074,472
Patented Jan. 22, 1963

---

3,074,472
FUEL FEEDING SYSTEM FOR GAS TURBINE ENGINES
Howard J. Williams, South Bend, Ind., assignor to The Bendix Corporation, South Bend, Ind., a corporation of Delaware
Continuation of application Ser. No. 408,233, Feb. 4, 1954, which is a continuation of application Ser. No. 42,302, Aug. 3, 1948. This application Aug. 29, 1960, Ser. No. 52,419
8 Claims. (Cl. 158—36.4)

This application is a continuation of my copending application Serial No. 408,233, filed February 4, 1954, now abandoned, which is a continuation of my now abandoned application Serial No. 42,302, filed August 3, 1948.

When gas turbine engines are used in vehicles such as aircraft, the pilot or operator should be able to accelerate and decelerate to selected speeds or loads by manipulating a suitable power control device without producing dangerously high temperatures in the burner system, stalling the compressor or dieout due to burner failure. In order to have maximum power available for acceleration, it is desirable to supply as much fuel as the burners will consume without overheating, but in engines having certain characteristics, temperature is not the only limitation which must be observed, since the compressor will tend to surge and even stall at certain engine speeds unless a predetermined ratio of fuel to air is maintained. For engines having certain characteristics, the surge and/or stall region may lie in the areas indicated in FIGURES 3, 4, 6 and 7 where fuel flow is plotted against engine r.p.m. Once this region is known, it can be avoided by properly controlling the rate of fuel feed, and an object of the present invention is to provide means whereby such control is obtained automatically while at the same time permitting maximum acceleration at the will of a pilot or operator.

Another object is to better adapt a fuel feed and power control device such as is disclosed in the copending applications of Frank C. Mock, Serial Nos. 596,620 and 716,154, filed May 30, 1945, and December 13, 1946, and now Patent Nos. 2,581,276 and 2,689,606, respectively, common assignee to gas turbine engines having certain characteristics.

A further object is to provide a fuel feed system for gas turbine engines wherein the rate of fuel feed to the burners may be varied automatically along an acceleration and/or a deceleration curve to obtain maximum efficiency or power output in the high power range of operation and to avoid burner failure or dieout upon throttling back to the idle or low power range of operation.

Another object of this invention is to provide a method of accelerating engines of the type specified without encountering compressor instability.

The foregoing and other objects and advantages will become apparent in view of the following description taken in conjunction with the drawings, wherein:

FIGURE 1 is a view in side elevation and partly broken away of a gas turbine propeller equipped with a fuel control system in accordance with the invention;

FIGURES 3 and 4 are curve charts illustrating the operation of the fuel control system of FIGURE 2;

FIGURES 6 and 7 are curve charts illustrating the operation of the control of FIGURE 5.

Figure 2:
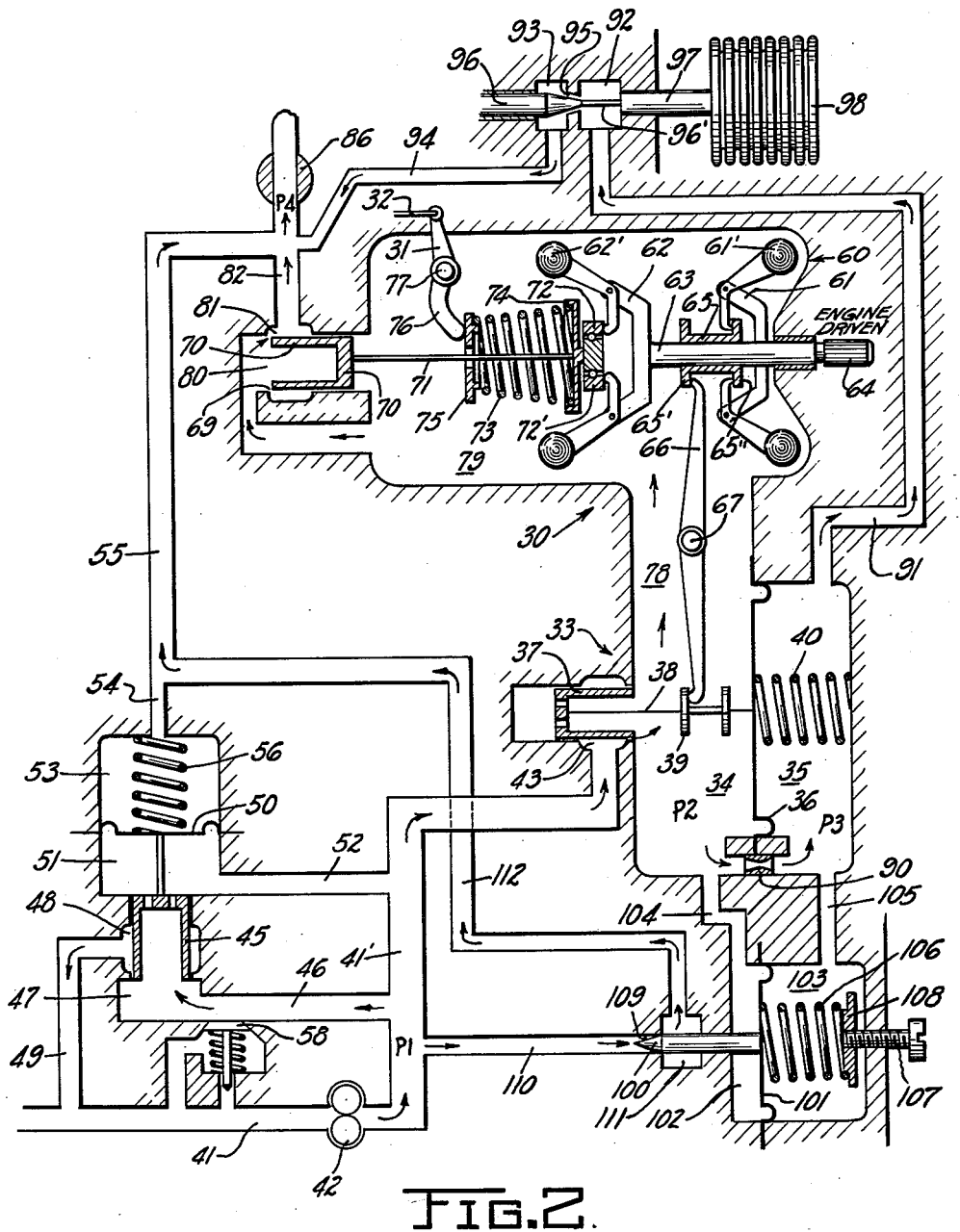
FIGURE 2 is a sectional schematic view of the fuel control system.

Referring first to FIGURE 1, the engine in general comprises a compressor 10 (shown as of the axial flow type) which forces air into an annular header 11 arranged to direct it to a plurality of annularly spaced combustion chambers 12 each containing a burner or generator tube 13 having air inlet holes in the walls thereof through which at least part of the air is fed for admixture with fuel to produce combustion. The burners 13 discharge into a collector ring 14 arranged to direct the hot air and products of combustion through a set of stationary distributing blades 15 against the blades 16' of a turbine rotor 16. The turbine 16 drives the air compressor 10, and these components may be mounted on a common shaft, not shown, or may be drivingly coupled through transmission mechanism. The turbine, in addition to driving the compressor, is adapted to drive a propeller 17 provided with propeller blades 17', which may be of the variable pitch type well known in the market and provided with suitable pitch changing mechanism 18 including a control lever 19 having connected thereto a link 20 which is shown extending back to a coordinating box 21 housing suitable mechanism for coordinating the various engine controls under a single lever 22, the latter connecting by means of a link 23 with a pilot's power control lever 24. The coordinated mechanism forms no part of the present invention; it is simply shown as illustrative of accessory equipment for engines of this type. The compressor 10 is mounted in a casing or housing 25, and forwardly of this casing is a flared air intake or cowling 26 which opens in the direction of aircraft travel. The part indicated at 27 houses reduction gearing between the turbine and propeller drive. As will be understood, part of the energy (usually the major part) resulting from the combustion and expansion of the precompressed air and fuel is utilized in driving the propeller, while the remainder is utilized as jet thrust in a reaction tube housed in a tail piece 28.

The present invention is primarily concerned with the fuel supply device or system shown schematically in FIGURE 2, the principal parts of the system being disposed in a housing generally indicated at 30 in FIGURE 1, where the unit is located adjacent the coordinating box and is provided with a control lever 31 which connects with said box by way of link 32. In this manner, both the rate of fuel feed and propeller pitch may be controlled through a single lever 24. Obviously the lever 31 could be controlled independently of propeller pitch or it could serve as the sole power control, as desired, or found expedient.

The device in the main comprises a regulator section or body, generally indicated at 33, which is divided into chambers 34 and 35 by a diaphragm 36. A regulator valve 37 is connected to the diaphragm 36 by means of a stem 38 having a grooved member 39 secured thereon for a purpose to be described. A spring 40 is mounted in chamber 35 and at its inner end bears against the diaphragm 36; it constitutes a minimum metering head regulator in that it determines the minimum value of the metering head at engine speeds which may be so low as to otherwise result in instability of the regulator.

Fuel is supplied under pressure to the regulator by way of a conduit 41, 41' having mounted therein suitable fuel pressurizing means such as an engine driven fuel pump 42, the conduit 41' terminating in an annular valve chamber 43. The supply (P1) pressure is maintained at a predetermined value over and above metered fuel (P4) pressure by means of a by-pass valve 45 which controls the return flow of fuel from conduit 41' by way of conduit 46 and valve chamber 47 to annular chamber 48 and conduit 49 back to conduit 41, or back to the low pressure or input side of pump 42. Valve 45 has its stem connected to a diaphragm 50 having on one side thereof a chamber 51 which is vented to supply pressure by conduit 52 and on its opposite side a chamber 53 which is vented to metered fuel (P4) pressure by way of passages 54 and 55. The fuel supply (P1) pressure will therefore be maintained at a constant value above metered fuel or nozzle discharge (P4) pressure as determined by the strength of spring 56.

A safety or maximum pressure relief valve is indicated at 58; it is designed to prevent dangerous pressures in the system due, for example, to the flow of fuel to the burners being suddenly cut off while the engine is running.

A control section or body is generally indicated at 60; it contains a speed metering head generator 61 carrying centrifugal weights 61' and an engine speed governor 62 carrying centrifugal weights 62', both said head generator and said governor in the example illustrated being carried by a common shaft 63 provided on its outer end with a pinion gear 64 adapted to be driven from the engine.

The speed metering weights 61' are operatively connected to the regulator valve 37 by means of a slide bearing 65 having flanged ends 65' and 65", and a lever 66 pivoted or fulcrumed at 67, said lever at its lower end engaging the member 39 on valve stem 38. When the shaft 63 is rotated, the governor weights 61', acting through the lever 66 and yoke 39, exert a force proportional to the square of engine speed in a direction tending to open the valve 37.

A fuel feed or metering restriction is indicated at 69; its area is controlled by a fuel feed or throttling governor valve 70 which is provided with a stem 71 carrying a thrust bearing 72 at its inner end, the outer race 72' of which is engaged by the inner ends of the pivoted governor weights 62'. A governor spring 73 encircles the valve stem or rod 71 and at its inner end abuts a thrust bearing or plate 74 carried by the said rod and at its outer end receives a contact plate 75. A lever 76 is secured on a shaft 77 rotatably mounted in the casing or frame of the unit and having secured on its outer end the throttle or control lever 31. When the levers 31 and 76 are rotated in a counterclockwise direction, the governor spring 73 is compressed, the valve 70 is opened and simultaneously the governor weights 62' are set inwardly; a clockwise movement of said levers has the opposite effect. The pilot selects any desired engine speed by varying the degree of compression of governor spring 73; the spring force which tends to open the governor valve, is opposed by the governor weight force which tends to close the valve. These two opposing forces cause the governor valve to seek a position of equilibrium at any given selected engine speed, at which the fuel flow to the engine burners maintains engine speed at the selected value as the force output of said weights equals the force output of said spring. During an acceleration of the engine to a new selected speed, for example, the unbalance between the opposing forces acting on valve 70 causes said valve to remain in a fixed wide open position until the increasing force output of the governor weights begins to overcome spring 73 at or near selected speed, and the valve moves towards closed position to cut-off fuel flow and govern the engine to selected speed.

The chamber 34 communicates by way of a passage 78 with governor chamber 79, and the latter communicates with chamber 80 in which the valve 70 is mounted. When the valve 70 is opened, fuel is metered across the valve into annular chamber 81 and thence flows by way of passage 82 to the metered fuel line 82', see FIGURE 1, and manifold ring 83. From this manifold ring, individual fuel lines 84 feed the fuel to the respective discharge nozzles 85 of the burners or generators 13. These nozzles may be of any suitable type adapted to open under pressure and spray fuel into the combustion chambers.

A fuel cut-off valve 86 is usually mounted in the conduit 82 to fully cut off flow of fuel to the engine when the latter is shut down.

Since a gas turbine tends to consume less fuel for a given throttle setting as the density of the air decreases with changes in altitude, it is desirable to provide for density compensation. This is accomplished by a density circuit including a control bleed 90 between the chambers 34 and 35, passage 91, chamber 92, valve chamber 93 and passage 94 terminating in the metered fuel conduit 82. A valve orifice 95 is defined between chambers 92 and 93 and is controlled by a contoured needle valve 96 provided with a stem 96' connected to a slide rod 97 which in turn is connected to the movable end of an aneroid or bellows 98, preferably loaded for response to changes in both pressure and temperature (see Patent No. 2,376,711 to Frank C. Mock) and located where it will be subject to compressor inlet pressure. The manner in which this density circuit operates will be more fully set forth in the description of operation.

For a more complete illustration and description of the device so far described and shown schematically in FIGURE 2, reference may be had to the copending application of Frank C. Mock, Serial No. 716,154, now Patent No. 2,689,606.

In order to carry out the objects of the invention, a contoured needle valve 100 is provided and is connected to a diaphragm 101 having chambers 102 and 103 on opposite sides thereof which are respectively in communication with the chambers 34 and 35 (P2 and P3 pressures) by means of passages 104 and 105. The diaphragm 101 is backed by a spring 106 which is adjustable by means of a screw 107 engaging at its inner end an anchor 108 on which the spring is seated. The needle 100 controls a port 109 which separates supply pressure conduit 110 from annular valve chamber 111. Fuel from chamber 111 flows by way of passage 112 to the passage 55 and thence to the metered fuel conduit 82.

*Operation*

Usually an electric starting motor is used to crank the engine while at the same time fuel is fed to the burners and ignited, and cranking continued until the engine attains a self-sustaining speed. In tracing the flow of fuel through the metering system, it may be assumed that the latter is empty at ground level, in which event the differential across the diaphragm 36 would be substantially zero and the regulator valve 37 would be open under the influence of the idle spring 40. If the throttle valve 70 is at idle or some partly open position and the engine is cranked, fuel will flow through the conduit 41, 41', and across the regulator valve 37 to chamber 34, from which it flows through passage 78 and chamber 79 across the valve 70 and then through conduit or passage 82 and fuel line 82' to the manifold ring 83 (FIGURE 1), and thence to the discharge nozzles by way of the individual fuel lines 84. A limited quantity of fuel will also flow through the control jet 90 to chamber 35 of the regulator and thence through the passage 91, orifice 95 and passage 94 to the conduit or passage 82.

The spring 40 has little effect on the differential across the diaphragm 36 at fuel flows above idle; its purpose is primarily to predetermine the minimum value of metering head across the governor valve 70 at speeds which may be so low as to result in instability of the control. The pressure differential across the diaphragm 36 (P2—P3) is proportional to that which is imposed across the governor or throttle valve 70 (P2—P4), and since both of these differential are substantially proportional to the square of engine speed, for any given position of the governor valve 70 and the density needle 96, the velocity and hence the rate fuel flow across the value 70 will be proportional to the square root of this differential, or to the speed directly. Actuation of the governor valve 70 by the levers 31 and 76 and spring 73 in a direction to increase the area of the metering opening 69, and thereby fuel feed and engine speed, causes a momentary decrease in the pressure drop across the valve 70 and a consequent decrease in the differential across the diaphragm 36, whereupon the force exerted by the speed metering weights 61' causes the regulator valve 37 to move towards open position and increase the pressure drop P2—P3 until the resulting force imposed on the diaphragm 36 again equals the effective force output of weight 61'; the metering head (P2—4) increases with P2—P3 to cause an increase in the flow of fuel to the burners and in engine speed. Movement of levers 31 and 76 in a clockwise or decelerating direction extends spring 73 and allows the governor valve 70 to move towards closed position; a momentary increase in the drop across the valve 70 and a consequent increase in the differential across the diaphragm 36 results. This increase in P2—P3 causes the regulator valve 37 to move towards closed position until the force across diaphragm 36 again balances the force output of weights 61' at the existing speed; a sharp decrease in fuel feed to the engine results and the engine decelerates until the governor weight force output equals the reduced governor spring force, at which time the governor valve 70 attains a condition of equilibrium at the reduced speed setting.

During acceleration and deceleration, the metering head P2—P4, and hence the rate of fuel feed, will increase and decrease as a function of engine speed along with the differential P2—P3 across diaphragm 36. The quantity of air delivered to the burners will, of course, also vary as a function of engine speed.

Upon a decrease in the density of the air flowing to the engine, less fuel is required to drive the turbine and compressor at a given speed, and unless the maximum rate of fuel delivered to the engine on acceleration is correspondingly reduced, much higher burner temperatures will be experienced during acceleration at altitude than would be the case at sea level under similar engine conditions, due to the extremely rich fuel-air ratio. It can be assumed for an engine of the type herein described that the rate of fuel feed required to maintain a given speed varies approximately directly with the entering air density. If a pilot or operator were to carefully "nurse" the power control lever during acceleration and adjust the governor valve 70 in a manner such that the rate of fuel feed increased in direct relation to engine speed, compensation for changes in density by regulating the differential across the governor valve would not be necessary, but the control would then be so sensitive as to be impractical; and this also holds true during deceleration. Again, in gas turbine engines for aircraft, it may be desirable to have a relatively high idling speed to insure against engine failure when in the air, and this correspondingly reduces the range of governor valve movement and increases sensitivity between low and high power settings.

The density control circuit operates in the following manner: Decrease in entering air density causes elongation of the bellows 93 and an increase in the area of the orifice 95, while an increase in air density has the opposite effect. For a given engine or turbine speed, the differential across the metering head regulator diaphragm 36 will be constant, and hence the flow through the control jet 90 will remain constant. All flow of fuel through the jet 90 will pass through the orifice 95, and hence the drop across the latter will vary inversely as the square of its area; and for a fixed or given position of the needle 96 (constant density) the drop across the orifice 95 will be proportional to the drop across the control jet 90. The sum of the drop across the orifice 95 and the drop across the diaphragm 36 (or jet 90) is equal to the drop across the governor valve 70, and at a given density, the total drop will be proportional to the square of engine speed. If the effective area of the orifice 95 is enlarged, there will be a corresponding decrease in the drop across this orifice. This will lower the P3 pressure and momentarily increase the P2—P3 differential across the diaphragm 36, whereupon the regulator valve will move toward closed position and reduce the metering head; a decrease in the effective area of 95 having the opposite effect. Thus, if the governor 70 is opened for acceleration at altitude, less fuel will be supplied to the burners than would be the case for a similar position of said valve at ground level or some lower altitude. By suitably contouring the density needle 96, substantially complete density compensation may be obtained. This advantage is not only present during acceleration and deceleration, but the density circuit will also maintain a given engine or turbine speed at all altitudes for any given or fixed position of the power control lever 24 (or the throttle lever 31).

Coming now to the operation of the circuit for "circumventing stall," it will be noted that the diaphragm 101 is in parallel with the regulator diaphragm 36, and hence this diaphragm 101 will also be positioned as a function of engine speed; and the spring 106 may be adjusted so that the differential will become effective on the needle 100 at selected engine speeds. The needle 100 which is connected to the diaphragm 101, controls the area of orifice 109 which connects the fuel in conduit 110 at pressure P1 with the fuel in conduit 112 at pressure P4. Since by-pass valve 45 functions to maintain the P1—P4 pressure drop constant at all times, orifice 109 flows a constant quantity of fuel for any given position of needle 100 regardless of changes in altitude. When the engine speed attains a value such that the differential across the diaphragm 101 will cause needle 100 to open the orifice 109, there will be a flow of fuel across said orifice, and thence by way of passages 112 and 55 to the metered fuel passage 82. This flow of fuel is additive to that metered across the governor valve 70 and it will cut in and out automatically.

If inefficiencies of a gas turbine engine for aircraft are disregarded, in general it may be said that air flow varies substantially linearly with engine speed; and to maintain a constant temperature at the turbine inlet, fuel flow should also vary substantially linearly with engine speed. In actual practice, it has been found that an engine utilizing a centrifugal compressor will adhere more closely to linear air and fuel flow characteristics than an engine utilizing an axial compressor.

Referring now to FIGURES 3 and 4, the curve 115 represents the fuel feed required for steady speed at a given propeller pitch. The dot and dash line 116 represents the maximum delivery of the fuel pump 42. Let it be assumed that the engine is operating at point 117 and the pilot opens the governor valve 70 sufficiently to accelerate to point 118; then the fuel supplied during this period of acceleration will follow the arrows from 117 to 119 on the 1300° F. temperature line 121 and will continue in substantially linear relation to engine speed to point 120. The initial increase in flow represented by the vertical arrows occurs as a result of the increase in the effective area of the governor valve at the then existing speed. At point 120 the needle 100 becomes effective and the line 122 is added to 121, producing an increase in burner temperature to say 1500° F. at 118, which can be assumed to still be below the stall region at the existing engine speed for the particular type of engine being considered while at the same time giving good acceleration. In FIGURE 4 the curves correspond to those of FIGURE 3 except in this instance the engine is operating at some high altitude, say 35,000'; and the fuel feed required for the same speed as in FIGURE 3 is much less. Here an uncompensated addition for acceleration (line 122) may prove of advantage for certain types of engines due to the fact that surge is affected by temperature and the tendency to surge increases with a decrease in atmospheric temperature, and to maintain a given speed or power output, the rate of fuel feed should be increased as the entering air temperature drops. Thus, in FIGURE 4, the percentage addition represented by the uncompensated line 122 is greater at altitude than at sea or ground level since the compensated fuel represented by curve 121 is much less. For example, the curve 121 could be compensated to give 1300° F. at high altitude and 1450° F. at ground level, and in each instance the increase in temperature resulting from the addition of curve 122 could net 1500°

F. for the upper limit of acceleration. Obviously, the needle 100 may be contoured to give different configurations to curve 122.

The advantages of automatic enrichment are not confined to avoidance of the stall region, since enrichment at some predetermined point on the acceleration curve may improve efficiency and result in a higher power output for a given throttle setting. Thus, for example, an engine may have an efficiency characteristic such that to maintain a constant temperature within a given limit during acceleration it will be necessary to feed fuel at a substantially linear rate with respect to engine speed until a certain speed is attained, and then increase fuel feed above the linear rate.

Also, enrichment when throttling back to the idle range may avoid dieout or burner failure. In FIGURE 3, the idle curve or line is indicated at 124. If it be assumed that the pilot or operator wishes to decelerate from point 118 to point 125 and moves the throttle lever back to idle position, the flow of fuel will follow the arrows between these two points. The first action is the closing of the throttle valve to idle position, which sharply reduces fuel flow but since the engine is still running at a relatively high rate of speed, the valve 100 remains open. It starts to close at 126, just above the dieout region, and when it is fully closed, the engine is operating only on idling fuel.

Figure 5:
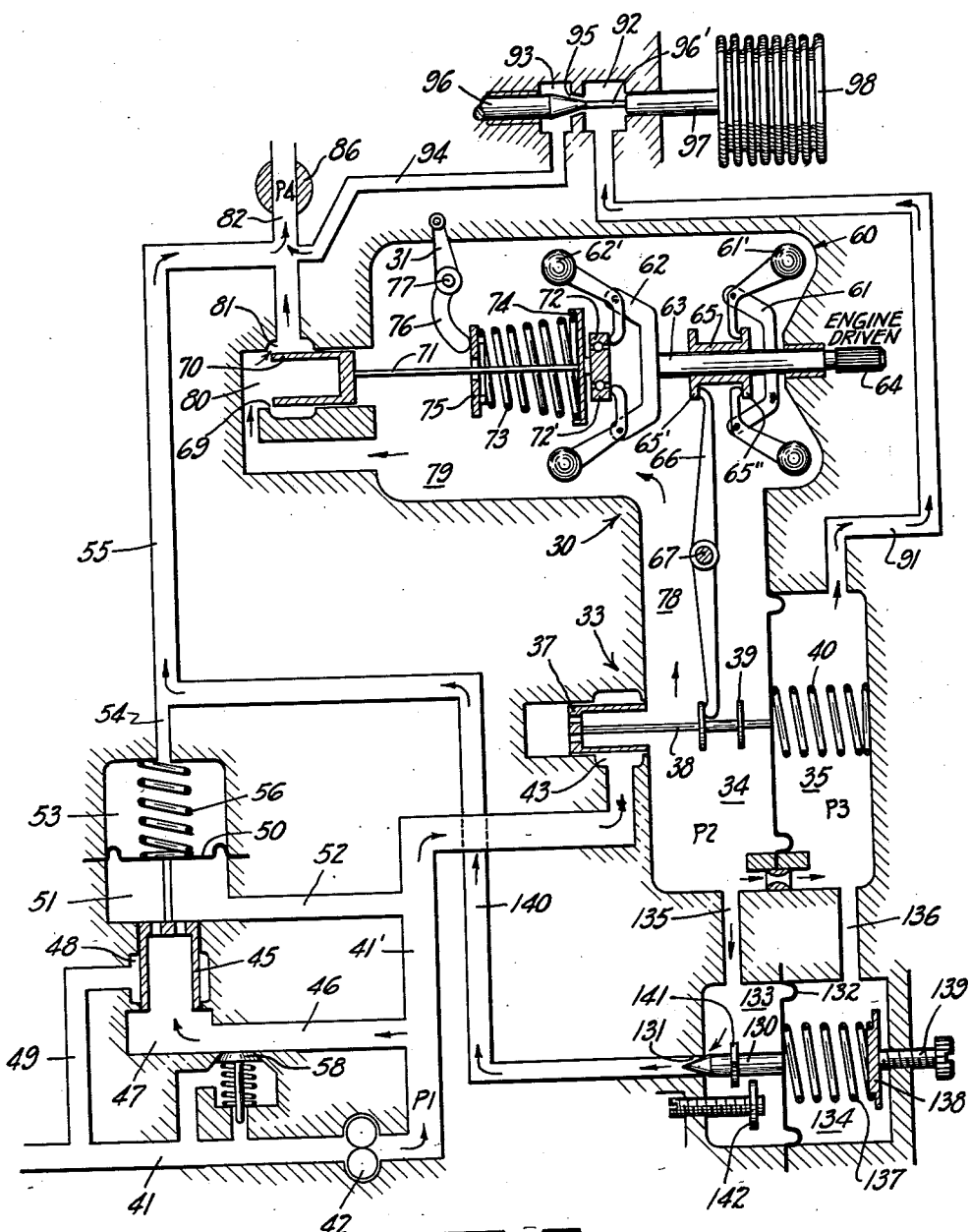
FIGURE 5 shows a somewhat modified version of the control system shown in FIGURE 2.

The idle curve is not shown on FIGURE 4. FIGURE 5 illustrates how the fuel metering device of FIGURE 2 may be modified to produce density compensation for the added acceleration fuel. In this figure, parts which correspond to those of FIGURE 2 are given similar reference numerals. The difference lies in the enrichment acceleration fuel circuit at the lower right-hand portion of FIGURE 5. The needle 130 (which corresponds to the needle 100 of FIGURE 2) controls variable orifice 131 and is connected to a diaphragm 132 having chambers 133 and 134 on opposite sides thereof, the chamber 133 being vented to the regulator chamber 34 by passage 135 and the chamber 134 being vented to the chamber 35 of said regulator by passage 136. The diaphragm 132 is backed by a spring 137 which is anchored to a block or abutment 138 adjustable by means of a screw 139. The orifice 131 controls communication between chamber 133 and a passage 140, which communicates with the passage 55 leading to the metered fuel conduit or passage 82. The maximum open position of needle 130 is adjustably determined by a contact member 141 adapted to engage an adjustable stop 142.

FIGURES 6 and 7 illustrate the operation of the fuel metering device of FIGURE 5. In this instance, the curves which correspond to those of FIGURES 3 and 4 are given similar reference characters except that a prime (') has been added. These figures also illustrate a condition wherein surge limit requires a dip in fuel flow in the medium speed range. It will be seen that the flow of fuel from chamber 34 by way of passage 135 and the chamber 133 and across the orifice 131 is compensated for changes in density in the same manner as compensation is obtained for the pressure drop across governor valve 70. In other words, as altitude is gained, the bellows 98 expands, enlarging the area of the orifice 95 and reducing the head across the governor valve 70, while at the same time reducing the head across the needle 130, so that the added acceleration fuel varies with changes in density. The contour of the needle 130 determines the arrow line between points 120' and 123. At 123 the valve 130 would no longer open due to the contact member 141 engaging the stop 142. Then assuming a constant governor valve area and a constant area for valve 130, metering would continue from 123 to 118' at maximum speed. Upon deceleration, the action as illustrated in FIGURE 6 is substantially the same as in FIGURE 3 except that there is compensation for changes in altitude.

In FIGURE 5 the percentage effect of the needle 130 is the same at sea or ground level as at altitude. This type of control may be more suitable for engines having certain characteristics. The contour of needle 130 and adjustment of spring 137 determine the effect of the needle on the overall flow represented by the curve 122'.

Although only two embodiments of the invention have been illustrated schematically and described, certain changes in form and relative arrangement of parts may be made as dictated by requirements and practical use.

I claim:

1. In a fuel feed and power control system for a gas turbine engine having a burner or generator to which air is supplied under pressure by a dynamic compressor driven by the turbine, means defining a fuel conduit having a fuel feed or metering restriction therein, a throttle valve for varying the area of said restriction to accelerate and decelerate the engine, pressure regulator means for automatically controlling a metering head across said restriction including a regulator valve, pressure responsive means connected to said regulator valve and means for producing a differential across said pressure responsive means as a function of engine speed to maintain the metering head across the throttle valve within predetermined upper limits during acceleration, means responsive to changes in density of the air flowing to the engine for also varying the metering head, a fuel pump for pressurizing the fuel flowing to the regulator valve, means defining a flow passage arranged to by-pass pressurized fuel from a point upstream of said regulator valve around said throttle valve, a contoured valve controlling flow of fuel through said by-pass, and means responsive to the differential across said first named pressure responsive means for controlling said latter valve.

2. In a fuel feed and power control system for a gas turbine engine having a burner or generator to which air is supplied under pressure by a dynamic compressor driven by the turbine, means defining a fuel flow conduit for conducting fuel to the burner having a fuel feed or metering restriction therein, a throttle valve for varying the area of said restriction to accelerate and decelerate the engine, pressure regulator means for controlling a metering head across said restriction including a regulator valve, a diaphragm connected to said regulator valve and means for producing a differential across said diaphragm varying with variations in engine speed to maintain the metering head across the throttle valve within predetermined upper limits during acceleration, a fuel pump for pressurizing fuel flowing to said regulator valve, a return circuit for the pressurized fuel having a relief valve operatively associated therewith, means responsive to changes in density of the air flowing to the engine arranged to also vary the metering head across said throttle valve, means defining a flow passage for conducting added acceleration fuel from a point upstream of said regulator valve to said conduit beyond said throttle valve, said latter flow passage communicating with said relief circuit through a variable flow orifice, a valve controlling said latter orifice, a diaphragm connected to said latter valve, and means for subjecting said latter diaphragm to the differential across said first named diaphragm to thereby initiate a flow of additional acceleration fuel to that metered across the throttle valve when the engine speed attains a predetermined valve.

3. In a fuel feed and power control system for a gas turbine engine having a burner and a compressor, a fuel conduit for conducting fuel to the burner having a restriction therein, first means responsive to changes in engine speed arranged for controlling the area of said restriction, speed signal generating means responsive to changes in engine speed and operatively connected to said first means in such a manner that the fuel pressure differential across said restriction is controlled to vary as a function of engine speed, and a third means responsive to the speed signal generated by said generating means for causing, at a predetermined engine speed during an acceleration of the engine, a flow to the burner in addition to the flow regulated by the restriction.

4. In a fuel feed and power control system for a gas turbine engine having a compressor for supplying air under pressure to a burner in which a combustible mixture of air and fuel is burned, a fuel conduit for conducting fuel to the burner, first engine speed responsive means arranged for controlling the flow of fuel to the burner during steady state operation of the engine, mechanism for controlling said first means to initiate acceleration of the engine by causing an abrupt enrichment of the fuel flowing to the burner and a first resultant increase in the ratio of fuel-to-air burned therein, second engine speed responsive means for establishing a predetermined rate of change of fuel flow to the burner during acceleration of the engine below a predetermined speed, and third means operative as a function of engine speed for causing, during acceleration of the engine above said predetermined speed, an additional enrichment of the fuel flowing to the burner and a second resultant increase in the ratio of fuel-to-air burned therein.

5. In a fuel feed and power control system for a gas turbine engine having a compressor for supplying air under pressure to a burner in which a combustible mixture of air and fuel is burned, a fuel conduit for conducting fuel to the burner, first means including a first variable restriction arranged for controlling the flow of fuel to the burner during steady state operation of the engine, mechanism for controlling said first means to initiate acceleration of the engine by causing an abrupt enrichment of the fuel flowing to the burner and a first resultant increase in the ratio of fuel-to-air burned therein, second means including a second variable restriction in series with said first variable restriction operatively connected to said first means for establishing a rate of change of fuel flow to the burner which results in a decrease in the ratio of fuel-to-air burned therein during an acceleration of the engine below a predetermined speed, and third means operative during acceleration of the engine above said predetermined speed for causing a flow to the burner in addition to the flow regulated by said variable restriction.

6. In a fuel feed and power control system for a gas turbine engine having a compressor for supplying air under pressure to a burner in which a combustible mixture of air and fuel is burned, a fuel conduit for conducting fuel to the burner, first means including a first variable area restriction arranged for controlling the flow of fuel to the burner during steady state operation of the engine, mechanism for controlling said first means to initiate acceleration of the engine by causing an abrupt enrichment of the fuel flowing to the burner and a first resultant increase in the ratio of fuel-to-air burned therein, second means including a second variable area restriction in series with said first variable area restriction operatively connected to said first means for establishing a predetermined rate of change of fuel flow to the burner during acceleration of the engine below a predetermined speed, and third means including a third variable area restriction in parallel with said second variable area restriction operative during acceleration of the engine above said predetermined speed for causing flow to the burner in addition to the flow regulated by said first means.

7. In a fuel feed and power control system for a gas turbine engine having a burner and a compressor, a fuel conduit for conducting fuel to the burner having a first and second restrictions in series flow relationship and a third restriction in parallel flow relationship with said first and second restrictions, first means including a first valve member responsive to changes in engine speed arranged for controlling the area of said first restriction, second means including a second valve member responsive to changes in engine speed operatively connected to said first means for controlling the area of said second restriction such that the fuel pressure differential across said first restriction is controlled to vary as a function of engine speed, and a third means including a third valve member responsive to a change in engine speed for controlling the area of said third restriction, said third means being operative, at predetermined engine speed, to cause flow to the burner in addition to the flow regulated by said restriction.

8. In a fuel feed and power control system for a gas turbine engine, a fuel supply conduit having a first restriction therein, a first valve for controlling the effective area of said restriction, adjustable engine governing means operatively associated with said first valve, other means including a second restriction and second valve member for controlling the effective area thereof in series with said first restriction for automatically maintaining the rate of fuel feed within predetermined limits during a transition in engine speed following adjustment of said governor and for generating a signal which varies as a function of an engine operating condition, and fuel regulating means operatively connected to said other means and responsive to the signal generated thereby, said fuel regulating means including a third restriction and third valve member for controlling the effective area thereof in parallel with said second restriction and being operative at a predetermined value of said engine operating condition to produce a flow to the burner in addition to the flow through said restriction, said third valve member being operative to cause a progressive increase in the effective flow area of said third restriction and thus fuel flow through said conduit as a function of said engine operating condition at values in excess of said predetermined value to effect a corresponding increase in turbine inlet temperature.

References Cited in the file of this patent
UNITED STATES PATENTS

| | | |
|---|---|---|
| 2,117,105 | Schimanek | May 10, 1938 |
| 2,414,322 | Mock | Jan. 14, 1947 |
| 2,581,275 | Mock | Jan. 1, 1952 |

UNITED STATES PATENT OFFICE
CERTIFICATE OF CORRECTION

Patent No. 3,074,472

January 22, 1963

Howard J. Williams

It is hereby certified that error appears in the above numbered patent requiring correction and that the said Letters Patent should read as corrected below.

Column 3, line 63, after "annular" insert -- valve --; column 4, line 63, for "differential" read -- differentials --; column 5, line 74, after "governor" insert -- valve --; column 8, line 63, for "valve" read -- value --; column 10, line 9, strike out "a".

Signed and sealed this 24th day of September 1963.

(SEAL)
Attest:

ERNEST W. SWIDER
Attesting Officer

DAVID L. LADD
Commissioner of Patents